US007245585B2

(12) United States Patent
Sullivan et al.

(10) Patent No.: US 7,245,585 B2
(45) Date of Patent: Jul. 17, 2007

(54) METHOD AND SYSTEM FOR TRANSMITTING TRAFFIC IN A VIRTUAL TUNNEL OF A TRANSMISSION LINE

(75) Inventors: Edward T. Sullivan, Highland Village, TX (US); Alexander A. Smith, Carrollton, TX (US); Guoliang Wu, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 959 days.

(21) Appl. No.: 09/997,626

(22) Filed: Nov. 28, 2001

(65) Prior Publication Data

US 2002/0037012 A1 Mar. 28, 2002

Related U.S. Application Data

(63) Continuation of application No. 09/325,687, filed on Jun. 3, 1999, now abandoned.

(51) Int. Cl.
*H04L 12/26* (2006.01)
*H04L 12/28* (2006.01)
*H04L 12/56* (2006.01)
*H04J 3/14* (2006.01)

(52) U.S. Cl. ...................... 370/235; 370/389

(58) Field of Classification Search ........... 370/399, 370/395.51, 419, 422, 395.1, 395.4, 230.1, 370/235–236, 229–230, 468, 389
See application file for complete search history.

(56) References Cited

U.S. PATENT DOCUMENTS

| 4,339,633 A | 7/1982 | Ahmed ................ 179/99 M |
| 4,631,641 A | 12/1986 | Brombal et al. ............ 361/424 |
| 4,893,306 A | 1/1990 | Chao et al. ................ 370/94.2 |
| 5,012,469 A | 4/1991 | Sardana ..................... 370/95.3 |
| 5,130,984 A | 7/1992 | Cisneros .................... 370/94.1 |
| 5,278,833 A | 1/1994 | Crisler et al. ............. 370/95.1 |
| 5,295,140 A | 3/1994 | Crisler et al. ............. 370/94.1 |
| 5,303,234 A | 4/1994 | Kou .......................... 370/85.2 |

(Continued)

FOREIGN PATENT DOCUMENTS

| EP | 0 509 648 A1 | 10/1992 |
| EP | 0 680 235 A1 | 11/1995 |
| EP | 0 700 186 A1 | 3/1996 |
| EP | 0 817 439 A2 | 1/1998 |
| EP | 0 818 940 A2 | 1/1998 |
| EP | 0 868 058 A1 | 9/1998 |
| EP | 0 901 307 A2 | 3/1999 |
| WO | WO 99/09689 | 2/1999 |

OTHER PUBLICATIONS

Ghani, N.; Mark, J.W. Hierarchical scheduling for integrated ABR/VBR services in ATM networks, Nov. 1997, Global Telecommunications Conference, GLOBECOM '97., IEEE, vol. 2, Iss., 3-8, pp. 779-784 vol. 2.*

(Continued)

*Primary Examiner*—Kevin C. Harper
(74) *Attorney, Agent, or Firm*—Baker Botts L.L.P.

(57) ABSTRACT

A network element for a telecommunications network includes a port for connection to a transmission line of the telecommunications network. A plurality of transmission line interfaces each include a scheduler to transmit traffic in port transmission slots allocated to the transmission line interface. An interface controller is stored in a storage medium of the network element. The interface controller is operable to selectively couple at least two transmission line interfaces to the port and to allocate a disparate portion of port transmission slots to each of the transmission line interfaces coupled to the port.

21 Claims, 6 Drawing Sheets

U.S. PATENT DOCUMENTS

| | | | |
|---|---|---|---|
| 5,412,652 A | 5/1995 | Lu | 370/85.12 |
| 5,467,348 A | 11/1995 | Fujii et al. | 370/60.1 |
| 5,515,376 A | 5/1996 | Murthy et al. | 370/85.13 |
| 5,537,403 A | 7/1996 | Cloonan et al. | 370/60.1 |
| 5,677,905 A | 10/1997 | Bigham et al. | 370/94.2 |
| 5,689,506 A | 11/1997 | Chiussi et al. | 370/388 |
| 5,712,851 A | 1/1998 | Nguyen et al. | 370/399 |
| 5,771,234 A | 6/1998 | Wu et al. | 370/396 |
| 5,796,720 A | 8/1998 | Yoshida et al. | 370/245 |
| 5,805,568 A | 9/1998 | Shinbashi | 370/223 |
| 5,838,924 A | 11/1998 | Anderson et al. | 395/200.69 |
| 5,841,771 A | 11/1998 | Irwin et al. | 370/360 |
| 5,850,399 A * | 12/1998 | Ganmukhi et al. | 370/412 |
| 5,867,502 A | 2/1999 | Chang | 370/477 |
| 5,920,412 A | 7/1999 | Chang | 359/128 |
| 5,982,776 A | 11/1999 | Manning et al. | 370/414 |
| 6,014,367 A * | 1/2000 | Joffe | 370/230 |
| 6,067,301 A | 5/2000 | Aatresh | 370/418 |
| 6,144,669 A | 11/2000 | Williams et al. | 370/401 |
| 6,163,542 A * | 12/2000 | Carr et al. | 370/399 |
| 6,175,572 B1 * | 1/2001 | Kim | 370/468 |
| 6,198,723 B1 * | 3/2001 | Parruck et al. | 370/230.1 |
| 6,381,214 B1 * | 4/2002 | Prasad | 370/230.1 |
| 6,381,216 B1 * | 4/2002 | Prasad | 370/236.1 |
| 6,556,571 B1 * | 4/2003 | Shahrier et al. | 370/395.4 |
| 6,606,302 B2 * | 8/2003 | Delattre et al. | 370/230.1 |
| 6,633,561 B2 * | 10/2003 | Christie | 370/352 |
| 6,643,293 B1 * | 11/2003 | Carr et al. | 370/399 |
| 6,665,301 B1 * | 12/2003 | Wu | 370/395.41 |
| 2001/0001608 A1 * | 5/2001 | Parruck et al. | 370/232 |
| 2002/0036981 A1 * | 3/2002 | Park | 370/230 |

OTHER PUBLICATIONS

"General Aspects of Digital Transmission Systems," XP-002083788, ITU-T Recommendation G.708, *ITU-T Telecommunication Standardization Section of ITU*, Mar. 1993, 19 pages, Mar. 1993.

International Search Report in International Application No. PCT/US00/15331, dated Aug. 31, 2000, 6 pages.

Wu, et al., "A Broadband Virtual Path SONET/ATM Self-Heating Ring Architecture and Its Economic Feasibility Study," *IEEE Global Telecommunications Conference*, Dec. 6-9, 1992, 8 pages.

Tsong-Ho Wu, "Cost-Effective Network Evolution, A three-phase path from todays SONET/STM ring transport to a SONET/ATM VP ring transport could facilitate the network evolution for broadband service," *IEEE Communications Magazine*, Sep. 1993, 10 pgs.

PCT Written Opinion in International Application No. PCT/US00/15426, dated Jun. 26, 2001, 5 pages.

Tai H. Noh, ATM Scenarios for SDH/SONET Networks, XP-000750438, *Bell Labs Technical Journal*, Jan.-Mar. 1998, 13 pages.

International Search Report in International Application No. PCT/US 00/15426, dated Sep. 21, 2000, 7 pages.

International Search Report in International Application No. PCT/US 00/15425, dated Sep. 7, 2000, 6 pages.

Kurimoto, et al., "An Expandible Multicast ATM Switch Based on Copy Trunk with New Delay Control and Cell Spacing Functions, XP 000628644, "*IEICE Trans. Commun.*, vol. E79B, No. 8, Aug. 1996, 7 pages.

Subramaniam, et al., Multicasting in ATM networks using MINs[1], *Computer Communications 19*, 1996, 11 pages.

International Search Report in International Application No. PCT/US00/15336, dated Sep. 4, 2000, 7 pages.

International Search Report in International Application No. PCT/US 00/15131, dated Sep. 7, 2000, 6 pages.

PCT Written Opinion in International Application No. PCT/US00/15131, dated Nov. 8, 2001, 5 pages.

McDysan, David E., et al., *ATM Theory and Application*. McGraw-Hill, Inc. ISBN 0-07-060362-6, pp. 365-385, 1994.

Erdengiz, Ali, "ATM Usage Policing and Traffic Shaping," Communications System Design (Jan. 1997).

Dobrowski, George et al., *ATM User-Network Interface Specification, Version 3.1*, The ATM Forum, Sep. 1994.

Cerent 454™ High Speed SONET/SDH Transport System, ALTS trade show, Las Vegas, Nevada on or about Dec. 1998.

"FLM 150 ADM LAN Extension Product Design Specification," Revision 1.1, Internal Design Specification for Product, sheets 6/353-10/353 and 72/353-75/353, Product publicly released on or about Dec. 1998.

"Product Design Specification (PDS) for FLASH-192, Release 1," Internal Design Specification for Product, pp. 1/916; 4-12/9161 315-320/916, Product publicly released on or about Mar. 1999.

"InterNetworking Systems; AnyMedia® Access Products; AnyMedia Access System," http://www.lucent.com/ins/products/anymedia.html, Printed Aug. 10, 2000.

"AnyMedia® Access System," Lucent Technologies, Inc. Marketing Communications, Sep. 1999.

"The AnyMedia™ Access System Anything's Possible," Lucent Technologies, Inc. Marketing Communications, 1997.

Held, G., *Understanding Data Communications*, Fifth Edition, Sams Publishing. ISBN No. 0-672-30934-3, Chapter 14, pp. 419-431.

McCloghrie, K., et al., "Management Information Base for Network Management of TCP/IP-based internets: MIB-II," SNMP Working Group, Mar. 1991.

"Draft New Recommendation 1.630 (ATM Protection Switching)," ITU Telecommunication Standardization Sector, COM 13-41-E, Sep. 1998.

Guérin, R., et al., "Equivalent Capacity and its Application to Bandwidth Allocation in High-Speed Networks," IEEE Journal on Selected Areas in Communications, vol. 9, No. 7, pp. 968-981, Sep. 1991.

Gün, L., et al., "Bandwidth Management and Congestion Control Framework of the Broadband Network Architecture," Computer Networks and ISDN Systems 26, Elsevier Science Publishers B.V., North-Holland, pp. 61-78, 1993.

"S/DMS TransportNode 'OC-3 Express'—Cost-Effective SONET Transport for Low-Capacity Applications", Northern Telecom Marketing Publications, Issue 1, pp. 1-31, Sep. 27, 1996.

*Universal Serial Bus Specification Revision 1.1*, Compaq Computer Corporation, Intel Corporation, Microsoft Corporation, NEC Corporation, Sep. 23, 1998.

"MMC Products," http://www.mc-net.com/top-roducts/productdescriptions.html, Printed Jul. 22, 1999.

"MMC Network's Products: AnyFlow 5400," http://www.mmcnet.com/Solutions/anyflow5400.asp, Printed Feb. 7, 2000.

"MMC Network's Products: AnyFlow 5500," http://www.mmcnet.com/Solutions/anyflow5500.asp, Printed Feb. 7, 2000.

"AnyFlow 5400 Product Overview," MMC Networks, undated.

"AnyFlow 5500 Product Overview," MMC Networks, undated.

SwitchStAR™ ATM Cell Based 8+8 Non-Blocking Single Chip Switching Memory, Preliminary IDT77V400, Commercial Temperature Range, Integrated Device Technology, Inc., pp. 1-23, May 1998.

SwitchStAR™ ATM Cell Based 8+8 Non-Blocking Single Chip Switch Controller, Preliminary IDT77V500, Commercial Temperature Range, Integrated Device Technology, Inc., pp. 1-14, May 1998.

Giroux, Natalie et al., *Traffic Management Specification, Version 4.0*, af-tm-0056.000, The ATM Forum, Apr. 1996.

*M4 Interface Requirements and Logical MIB*, af-nm-0020.000, The ATM Forum, Oct. 1994.

PCT International Search Report in International Application No. PCT/US 00/15337, dated Aug. 24, 2000, 7 pages.

K. Sriram, "Methodologies for bandwidth allocation, transmission scheduling, and congestion avoidance in broadband ATM networks," *Computer Networks and ISDN Systems*, vol. 26, No. 1, Sep. 1993, 17 pages.

Fabrice Guillemin, et al., "Some Traffic Aspects in Virtual Private Networks over ATM," XP-000702583, Source Unknown, Apr. 1996, 12 pages.

Noriharu Miyaho, et al., "Integrated Switching Architecture and Its Traffic Handling Capacity in Data Communication Networks," XP 000692355, *IEEE Trans. Commun.*, vol. E79-B. No. 12, Dec. 1996, 13 pages.

M. Huterer, "ATM on SDH," XP 000685832, *Alcatel Telecommunications Review*, 1st Quater 1997, Jan. 1997, 9 pages, Jan. 1997.

* cited by examiner

METHOD AND SYSTEM FOR TRANSMITTING TRAFFIC IN A VIRTUAL TUNNEL OF A TRANSMISSION LINE

RELATED APPLICATION

This application is a continuation of U.S. application Ser. No. 09/325,687, entitled "METHOD AND SYSTEM FOR TRANSMITTING TRAFFIC IN A VIRTUAL TUNNEL OF A TRANSMISSION LINE" filed Jun. 3, 1999 (abandoned).

This application is related to copending U.S. application Ser. No. 09/325,497, entitled "TRANSMISSION SLOT ALLOCATION METHOD AND MAP FOR VIRTUAL TUNNELS IN A TRANSMISSION LINE" filed Jun. 3, 1999.

TECHNICAL FIELD OF THE INVENTION

This invention relates generally to telecommunications systems, and more particularly to a method and system for transmitting traffic in a virtual tunnel of a transmission line.

BACKGROUND OF THE INVENTION

Telecommunications networks have traditionally been circuit-switch networks that have transmission paths dedicated to specific users for the duration of a call and that employ continuous, fixed-bandwidth transmission. Due to growth in data traffic created by the Internet and its related technologies, however, telecommunications networks are being moved to a packet-switching transmission model. Packet-switch networks provide a large range of digital services, from data to video to basic voice telephony. Packet-switch networks can allow dynamic bandwidth and may be connectionless with no dedicated path or connection-oriented with virtual circuits and dedicated bandwidth along a predetermined path.

Asynchronous transfer mode (ATM) is a connection-oriented packet-switching technology in which information is organized into small, fixed length cells. ATM carries data asynchronously, automatically assigning data cells to available time slots on demand to provide maximum throughput. Compared with other network technologies, ATM provides large increases in maximum supported bandwidth, designed-in isoynchronous traffic support, support for multiple types of traffic such as data, video, and voice transmissions on shared communication lines, and virtual networking capabilities, which increase bandwidth utilization and ease network administration.

ATM cells are routed through a telecommunications network at high speeds using a switching label included in the cell. The switching label has two sections that define a virtual path (VP) and a virtual channel (VC) in the network through which the cell is routed. The use of virtual paths and virtual channels allows physical bandwidth in the network to be subdivided and separately commercialized.

Because of the low latency and predictability throughput ATM offers, it is capable of providing quality of service (QoS) features. QoS is defined in terms of the attributes of end-to-end ATM connections and is important in an integrated service network, particularly for delay-sensitive applications such as audio and video transmissions, as well as voice-over IP. Other applications in which QoS may be important include traditional data communications, imaging, full-motion video, and multimedia, as well as voice.

Performance criteria for describing QoS for a particular connection include cell loss rate (CLR), cell transfer delay (CTD), and cell delay variation (CDV). ATM traffic is classified as either constant bit rate (CBR) traffic, real-time or non real-time variable bit rate (VBR) traffic, available bit rate (ABR) traffic, and unspecified bit rate (UBR) traffic depending on the QoS parameters applied to the traffic. CBR and VBR traffic utilize dedicated bandwidth and are intended for real time applications. ABR traffic is intended for non-real time applications which can control, on demand, their transmission rate in a certain range. Like ABR, UBR traffic is intended for non-real time applications which do not have any constraints on the cell delay and cell delay variations.

CBR, VBR, and other dedicated bandwidth traffic can be transmitted in a virtual channel assigned to a customer. Transmission of ABR, UBR, and other types of dynamic bandwidth traffic, however, is dependent on variable conditions and transmission line constraints. As a result, dynamic traffic sources must compete with each other for available bandwidth in a transmission line. This limits QoS levels that can be provided by a telecommunications carrier and commercialization of the telecommunications system.

SUMMARY OF THE INVENTION

The present invention provides an improved method and system for transmitting traffic in a virtual tunnel of a transmission line that substantially eliminates or reduces the disadvantages and problems associated with previous systems and methods. In particular, a distinct interface is provided for each virtual tunnel in a transmission line. The interface independently queues and schedules dedicated and dynamic traffic for the virtual tunnel.

In accordance with one embodiment of the present invention, a network element for a telecommunications network includes a port for connection to a transmission line of the telecommunications network. A plurality of transmission line interfaces each include a scheduler to transmit traffic in port transmission slots allocated to the transmission line interface. An interface controller is stored in a computer-readable medium of the network element. The interface controller is operable to selectively couple two or more transmission line interfaces to the port and to allocate a disparate portion of port transmission slots to each of the transmission line interfaces coupled to the port.

More specifically, in accordance with a particular embodiment of the present invention, the network element is a combined asynchronous transport mode (ATM) switch and add/drop multiplexer, or a multi-protocol time division multiplexed (TDM) switch including ATM switching or multiplexing functionality. In these and other embodiments, the switch includes a plurality of ports for connection to disparate transmission lines of the telecommunications network. The interface controller is operable to selectively couple at least two of the transmission line interfaces to each port and, for each port, to allocate a disparate portion of port transmission slots to each of the transmission line interfaces coupled to the port.

Technical advantages of the present invention include providing an improved network element and method for transmitting traffic in a telecommunications system. In particular, the network element includes a plurality of transmission line interfaces that each independently queue and schedule traffic for a virtual tunnel in a transmission line. The distinct interfaces allow dynamic traffic to be transported within a virtual tunnel, and even combined with dedicated or other dynamic traffic sources. As a result, virtual tunnels can be used for all types of traffic and quality of service (QoS) levels. The virtual tunnels allow the creation a logical mesh topology using the physical ring, which provides great flexibility in creating very different topologies from the physical network. In addition, traffic in a virtual tunnel need not compete with other traffic for switch fabric resources at intermediate nodes. This allows a telecommunications provider to better utilize its network bandwidth resources and to better support its customers with varying needs of dynamic and dedicated traffic.

Another technical advantage of the present invention includes providing an improved asynchronous transport mode (ATM) element. In particular, the ATM element allows available bit rate (ABR) traffic and unspecified bit rate (UBR) traffic to be scheduled by a distinct virtual interface for transmission in a virtual tunnel of a transmission line. As a result, virtual channel connections (VCC) can be established for any type of ATM traffic and can be combined in the virtual tunnel.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
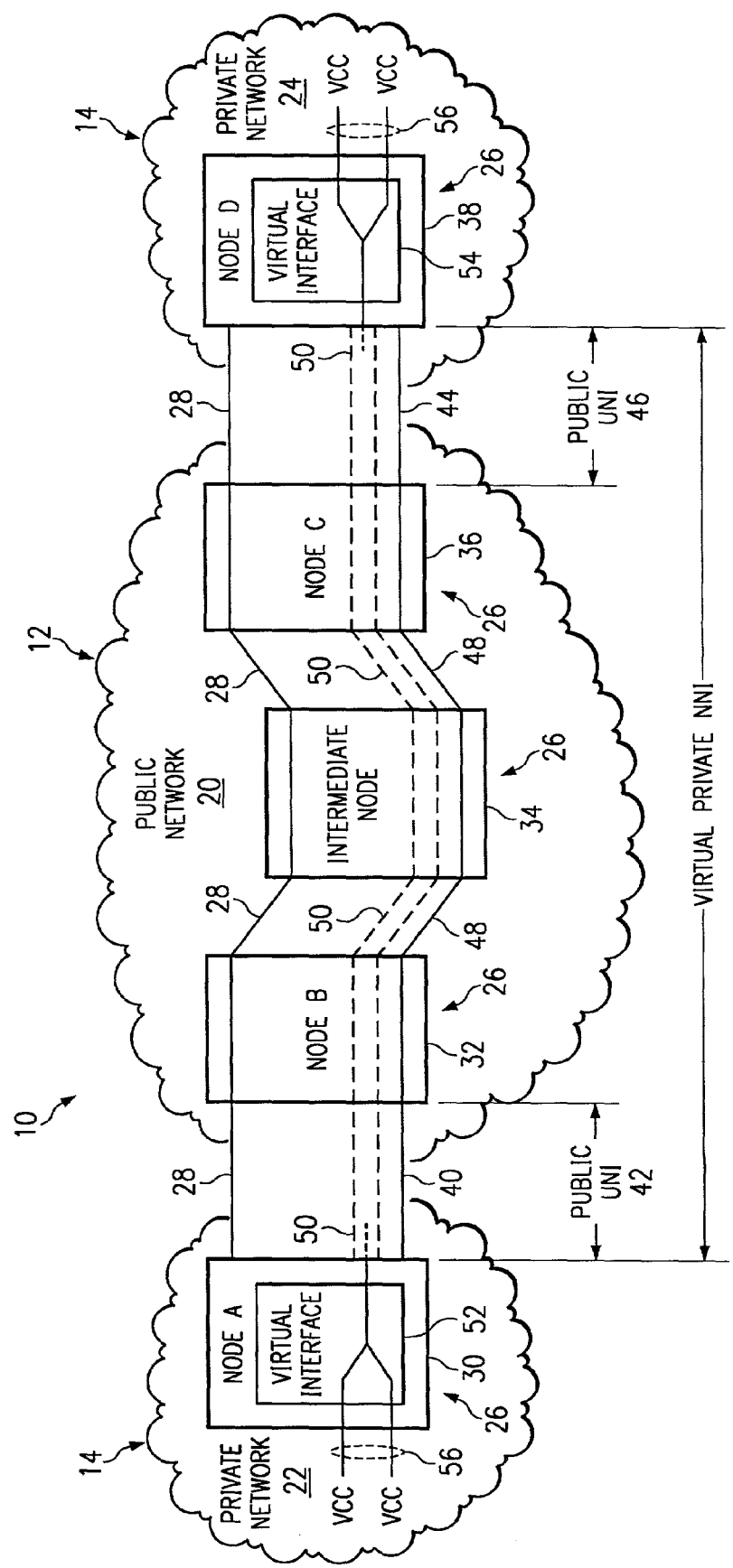
FIG. 1 is a block diagram illustrating a telecommunications system in accordance with one embodiment of the present invention.

FIG. 1 illustrates a telecommunications system 10 in accordance with one embodiment of the present invention. In this embodiment, the telecommunications system 10 comprises a public portion 12 and a private portion 14 that each transmit voice, data, other suitable types of information, and/or a combination of different types of information. The public portion 12 includes a public network 20 such as the Internet. The private portion 14 includes remote private networks 22 and 24. The private networks 22 and 24 are each an Intranet or other suitable network such as a private local area network (LAN) or a private wide area network (WAN). The telecommunications system 10 may be entirely implemented in either the public network 20 or in one of the private networks 22 or 24, or may be otherwise suitably distributed between disparate networks.

Referring to FIG. 1, the telecommunications system 10 includes a plurality of nodes 26 interconnected by transmission lines 28. The nodes 26 each comprise a network element capable of communicating traffic in the telecommunications system 10. The network element may be a switch, router, add/drop multiplexer or other suitable device capable of directing traffic in the telecommunications system 10.

The transmission lines 28 provide a physical interface between the nodes 26. Each physical interface is defined by the bandwidth of the connecting transmission line 28 which may be a DS-3 line, an OC-3 line, an OC-12 line, or any other suitable bandwidth. The transmission lines 28 each comprise optical fiber, cable, twisted wire, or other suitable wireline or wireless link capable of transporting traffic between two nodes 26.

For the embodiment of FIG. 1, the telecommunications system 10 includes a private boundary node 30 ("Node A") at a boundary of the private network 22, a public boundary node 32 ("Node B") at a first boundary of the public network 20, an intermediate node 34 within the public network 20, a public boundary node 36 ("Node C") at a second boundary of the public network 20, and a private boundary node 38 ("Node D") at a boundary of the private network 24. The nodes 30, 32, 34, 36, and 38 are each asynchronous transport mode (ATM) elements or multi-protocol elements having functionality for processing ATM traffic in which information is organized into small, fixed length cells. The ATM cells are routed by the nodes 30, 32, 34, 36, and 38 using switching labels included in the cell. The switching label has two sections that define a virtual path (VP) and a virtual channel (VC) in the telecommunications system 10 through which the cell is routed. Use of virtual paths (VPs) and virtual channels (VCs) allows physical bandwidth of the telecommunications system 10 to be subdivided and separately commercialized.

A virtual channel (VC) 40 is formed in the transmission line 28 between Nodes A and B. The virtual channel (VC) 40 forms a public universal network interface (UNI) 42 between Node A in the private network 22 and Node B in the public network 20. Similarly, a virtual channel (VC) 44 is formed in the transmission line 28 between Nodes C and D. The virtual channel (VC) 44 forms a public universal network interface (UNI) 46 between Node C in the public network 20 and Node D in the private network 24. Virtual channels (VCs) 40 and 44 together with virtual channels (VCs) 48 in the public network 20 between Nodes B and C form a virtual tunnel 50 between Nodes A and D. The virtual tunnel 50 is a virtual channel (VC), virtual path (VP), or any other suitable portion and/or construct of one or more transmission lines 28. The virtual tunnel 50 together with a virtual interface 52 at the entrance to the virtual tunnel 50 and a termination interface 54 at the end of the virtual tunnel 50 forms a virtual network network interface (V-NNI) between Nodes A and D. Nodes B and C need not know of the virtual network network interface (V-NNI). The virtual interface 52 aggregates and transmits traffic designating the virtual tunnel 50. Traffic designates the virtual tunnel 50 when the traffic includes information indicating that it is to be transmitted in the virtual tunnel 50. The termination interface 54 separates traffic received from the virtual tunnel 50 for individualized routing. Accordingly, virtual channel connections (VCCs) 56 can be transmitted through the telecommunications system 10 in the virtual tunnel 50 and need not compete with other designated traffic outside of the virtual tunnel 50 and inside the system 10.

Figure 2:
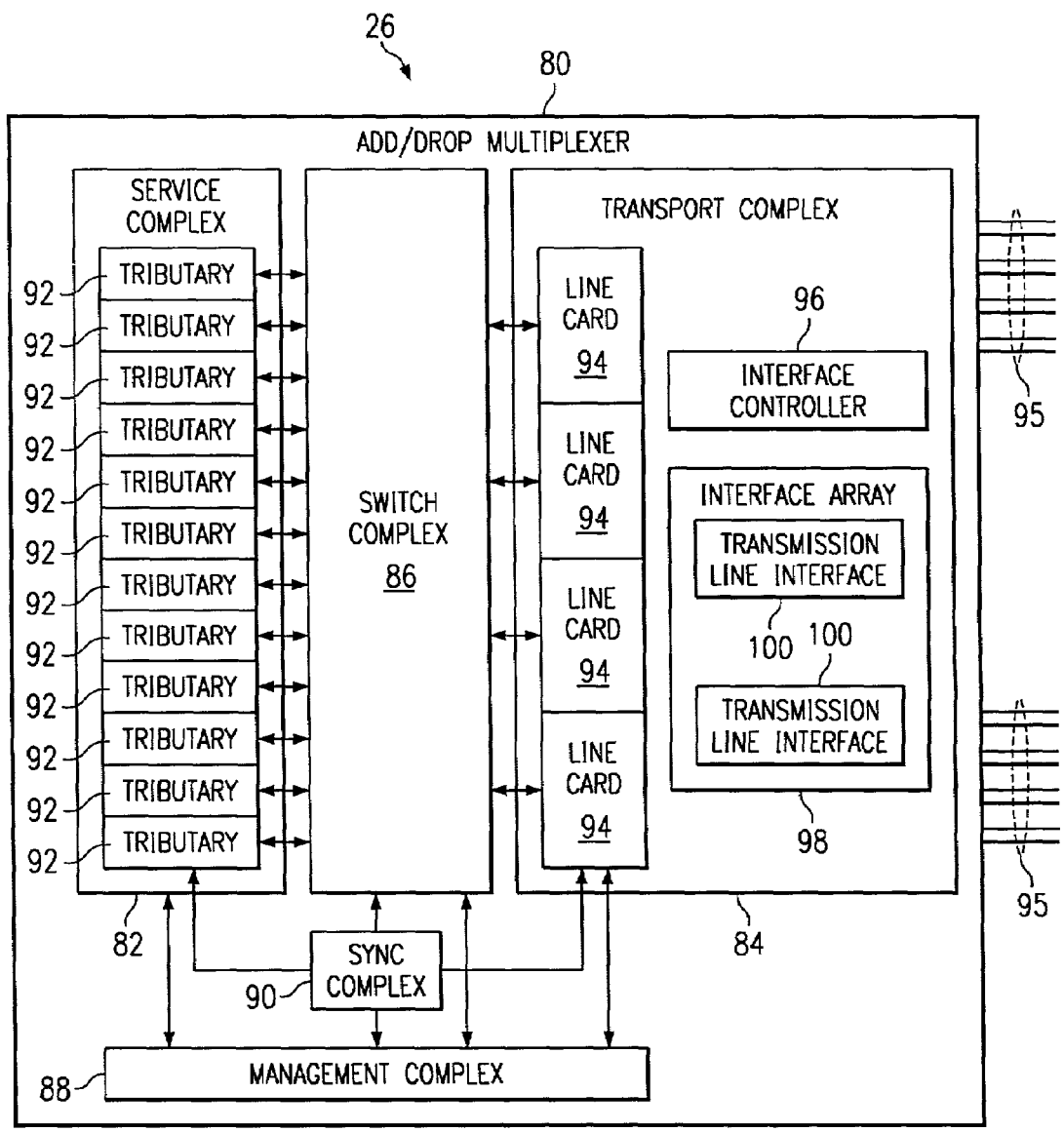
FIG. 2 is a block diagram illustrating an add/drop multiplexer element for the telecommunications system of FIG. 1 in accordance with one embodiment of the present invention.

FIG. 2 illustrates details of Node A in accordance with one embodiment of the present invention. In this embodiment, Node A is a multi-protocol add/drop multiplexer 80. As described in more detail below, the add/drop multiplexer 80 includes a plurality of transmission line interfaces that each independently queue and schedule traffic for a transmission line or a virtual tunnel in a transmission line. Remaining Nodes B, C, D, and E may be similarly configured.

Referring to FIG. 2, the add/drop multiplexer 80 comprises a service complex 82, a transport complex 84, switch complex 86, a management complex 88, and a synchronization complex 90. The disparate complexes 82, 84, 86, 88, and 90 are interconnected by one or more networks or backplanes in the add/drop multiplexer 80.

The service complex 82 includes a plurality of tributary cards 92. The tributary cards 92 each receive customer input/output (I/O) and perform conversions necessary for processing by the switch complex 86.

The transport complex 84 includes a plurality of line cards 94 for transmitting data on the transmission lines 95. In a particular embodiment, the line cards 94 are OC-3 or OC-12 line cards that are bi-directional and can handle optical to electrical (O/E) and electrical to optical (E/O) conversions. In this embodiment, the line cards 94 also handle the line and selection overhead extraction and insertion.

For the embodiment of FIG. 2, the transport complex 84 also includes an interface controller 96 and an interface array 98 comprising a plurality of transmission line interfaces 100. The interface controller 96 is implemented by software stored in a computer-readable medium for execution by a processor of the add/drop multiplexer 80. The computer-readable medium is a random access memory (RAM), a read only memory (ROM), or other suitable medium capable of storing instructions for execution by a processor. The interface array 98 is implemented by an application specific integrated chip (ASIC), software, or a combination of hardware and software. Both the interface controller 96 and interface array 98 may, in another embodiment, be separately implemented in each of the line cards 94, or for each port of the line cards 94.

As described in more detail below, the interface controller 96 is operable to generate a port memory map for each port of the transport complex 84 and to couple transmission line interfaces 100 from the interface array 98 to the ports of the line cards 94. A transmission line interface 100 is coupled to a port when it is connected to the port for use as a physical interface in connection with a transmission line 95 or as a virtual interface in connection with a virtual tunnel in the transmission line 95. An interface is physical when it is for a physical rate of a port or virtual when for a virtual rate of the port. The transmission line interface 100 is coupled to the port by a dedicated or other suitable bus or by dedicated or other suitable lines and/or switches. The interface controller 96 is also operable to selectively allocate port transmission slots from the port memory map to the transmission line interfaces 100 coupled to the port. Accordingly, the interface controller 96 can dynamically implement and size virtual interfaces in each of the outlet ports of the add/drop multiplexer 80.

The switch complex 86 comprises a plurality of switch fabric cards including an ATM switch fabric card. The ATM switch fabric card receives ATM cells on an input port and switches them to an output port. In switching the ATM cells, the switch complex 86 first translates necessary virtual path (VP) and virtual channel (VC) addresses.

The management complex 88 monitors and controls the status of the service, transport, switch, and synchronization complexes 82, 84, 86, and 90. The management complex 88 also maintains alarm, protection switching, and provisioning databases for the add/drop multiplexer 80. The synchronization complex 90 synchronizes the service, transport, and switch complexes 82, 84, and 86 by providing a stable traceable reference clock.

Figure 3:
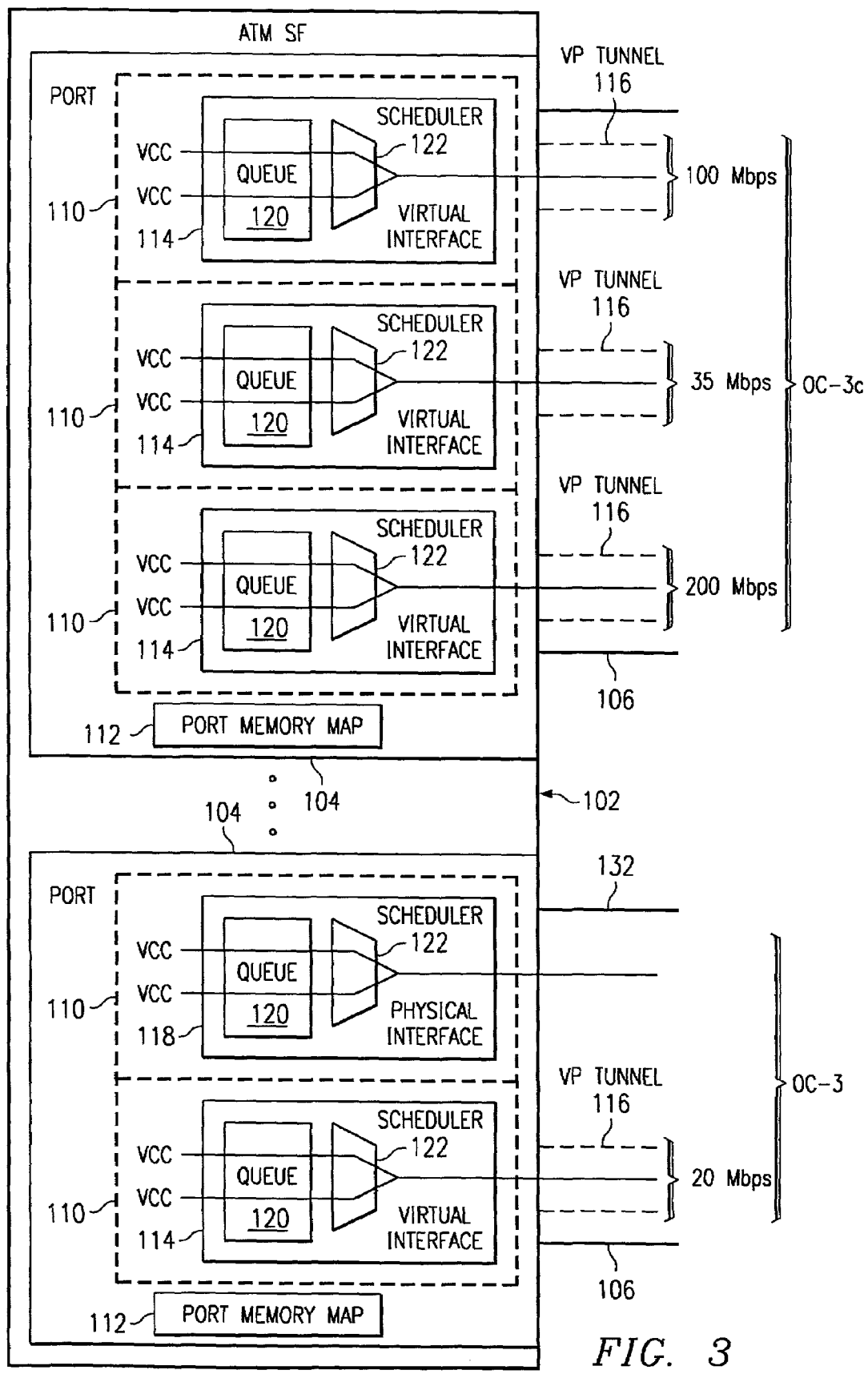
FIG. 3 is a block diagram illustrating a line card for the add/drop multiplexer of FIG. 2 in accordance with one embodiment of the present invention.

FIG. 3 illustrates an ATM switch fabric 102 for use in the add/drop multiplexer 80 in accordance with one embodiment of the present invention. In this embodiment, the ATM switch fabric 102 comprises a plurality of ATM output ports 104 for connection to disparate transmission lines 106. The outlet ports 104 each receive ATM traffic from the switch complex 86 of the add/drop multiplexer 80 and transmit the traffic in a corresponding transmission line 106. The ATM traffic comprises dedicated traffic such as constant bit rate (CBR) traffic and real-time and non real-time variable bit rate (VBR) traffic, as well as dynamic traffic such as available bit rate (ABR) traffic and unspecified bit rate (UBR) traffic. Dynamic traffic is traffic that is subject to change, has bandwidth that can be shared between connections, and/or has an unspecified rate within a range. The constant bit rate (CBR), real-time variable bit rate (VBR), and other dedicated traffic utilize substantially constant and/or dedicated bandwidth and are intended for real time applications such as audio, video, and voice-over IP transmissions. The dynamic traffic is generally bursty in nature. The available bit rate (ABR) traffic is intended for real time applications which can control, on demand, their transmission rate in a certain range. The unspecified bit rate (UBR) traffic is intended for non-real time applications which do not have any constraints on cell delay and cell delay variation. Quality of service (QoS) levels are defined for each traffic type based on cell loss rate (CLR), cell transfer delay (CTD), and cell delay variation (CDV).

Referring to FIG. 3, the outlet ports 104 each include one or more interfaces 114 and 118 and a port memory map 112. Each interface 114 or 118 is defined by a transmission line interface 100 of the interface array 98 coupled to the port 104. The transmission line interfaces 100 form virtual interfaces 114 for virtual tunnels 116 in the transmission line 106 and physical interfaces 118 for the physical bandwidth of the transmission line 106. The virtual interfaces 114 each transmit traffic designating a corresponding virtual tunnel 116 that is defined by a portion of the bandwidth of the transmission line 106. The physical interfaces 118 each transmit traffic of the port 104 in the bandwidth of the transmission line 106.

The virtual and physical interfaces 114 and 118 each comprise a queue 120 and a scheduler 122. The queue 120 receives designated virtual channel connections (VCC) of any designated class and temporarily stores the traffic for the scheduler 122. The scheduler 122 shapes traffic from the queue 120 and transmits the traffic in the transmission line 106 or the virtual tunnel 116 of the transmission line 106. In shaping the traffic, the scheduler 122 aggregates virtual channel connection (VCC) traffic in a corresponding transmission line 106 and virtual tunnel 116 and ensures that the sum of aggregate virtual channel connection (VCC) traffic does not exceed the transmission line rate of the corresponding virtual tunnel 116. The virtual and physical interfaces 114 and 118 may also include back pressure transmission rate adaptation buffers to account for the egress rate of the scheduler 122 not exactly matching the physical link rate due to limited schedule table length and the like.

For a virtual interface 114, the scheduler 122 transmits traffic from the queue 120 in a set of port transmission slots allocated to the interface 114 from the port memory map 112. The allocated port transmission slots define the virtual tunnel 116 corresponding to the virtual interface 114. The capacity of the virtual interface is equal to the transmission line rate of the virtual tunnel 116. The scheduler 122 ensures the transmission line rate allocated to the virtual tunnel 116 is not exceeded. For the physical interfaces 118, the scheduler 122 transmits traffic from the queue 120 in the port transmission slots representing physical bandwidth. Accordingly, the physical interface 118 uses the physical bandwidth of the corresponding transmission line 106.

For the embodiment of FIG. 3, the bandwidth of a first transmission line 106 is entirely subdivided into a plurality of virtual tunnels 116. For example, the first transmission line 106 may be an OC-3c transmission line subdivided into three disparate virtual tunnels 116, comprising transmission rates of 100 Mbps, 35 Mbps, and 20 Mbps, respectively. To support this configuration, the port 104 includes separate virtual interface 114 for each virtual tunnel 116. The bandwidth of a second transmission line 132 is subdivided into a virtual tunnel 116 and a remaining portion 134 that transmits traffic of the port 104 not designating the virtual tunnel 116. For example, the second transmission line 132 may be an OC-3c transmission line comprising a 20 Mbps virtual tunnel 116. To support this configuration, the port 104 includes separate virtual interfaces 114 for the virtual tunnel 116 and the remaining bandwidth of the transmission line 106. The interface of the remaining bandwidth is illustrated as a physical interface to illustrate that concept.

Figure 4:
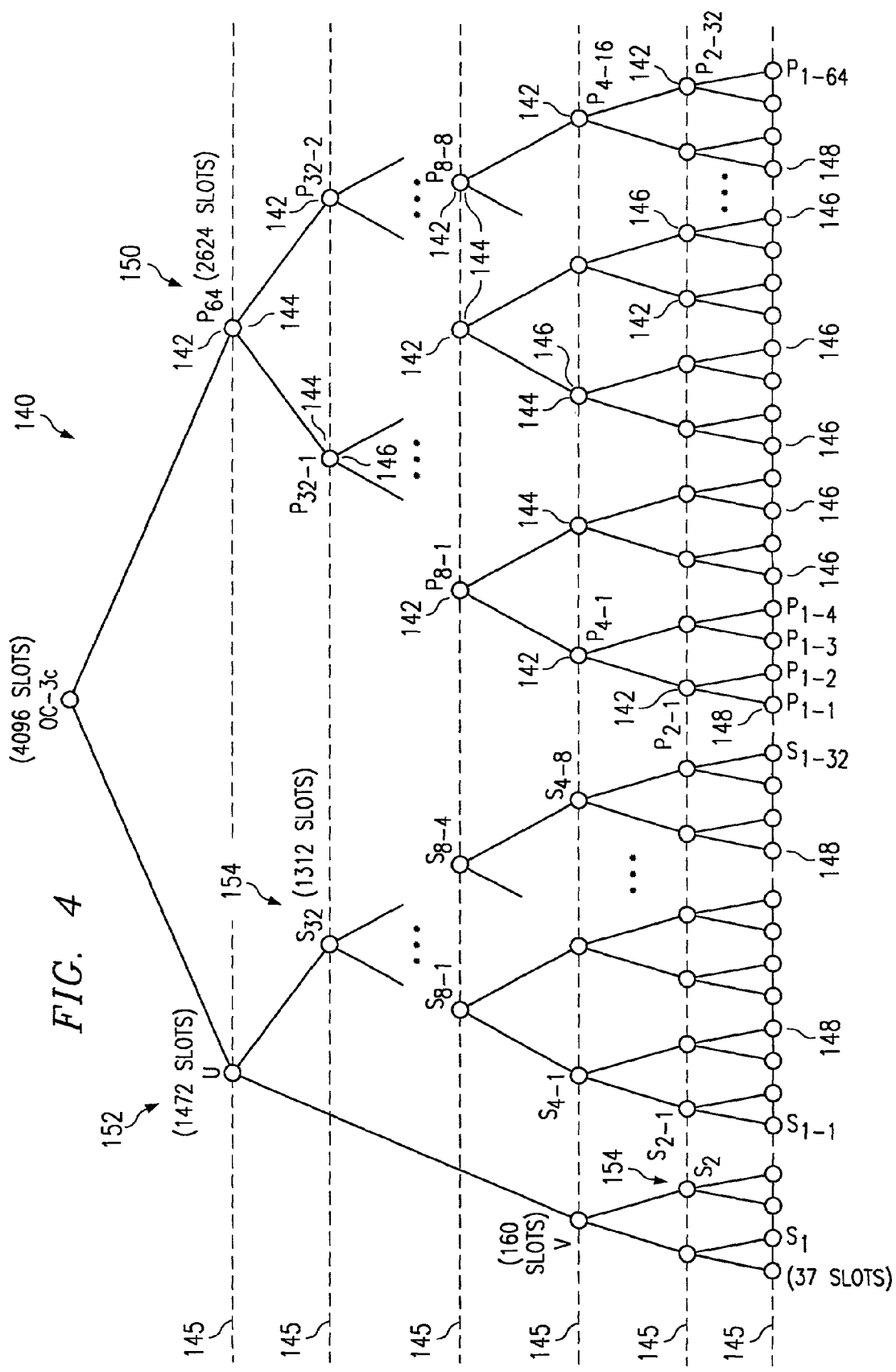
FIG. 4 is a schematic diagram illustrating a map of port transmission slots for the line card of FIG. 3 in accordance with one embodiment of the present invention.

FIG. 4 illustrates the details of a port memory map 140 for each port 104 of the ATM switch fabric 102 in accordance with one embodiment of the present invention. In this embodiment, transmission slots of a port are grouped based on a base transmission rate for the port. The base transmission rate is a foundation rate for the port 104 or virtual tunnels 116 supported by the port 104. The base transmission should provide the desired granularity for assignable bandwidth. The base transmission rate is preferably the lowest transmission rate of the port or of a virtual tunnel supported by the port and may be a standardized rate such as the DS-1 rate or other suitable rate.

Referring to FIG. 4, port memory map 140 comprises a plurality of hierarchal sets 142 of port transmission slots. The hierarchical sets 142 are arranged in a series of hierarchical levels 145 with a plurality of hierarchical sets 142 in one level 145 together containing the port transmission slots of a hierarchical set 142 in a next higher level 145. The port transmission slots are the transmission slots available to the port 104 for transmission of traffic in a connected transmission line 106. Accordingly, the number of port transmission slots varies with the bandwidth of the transmission line 106. For example, a port 104 adapted for connection to an OC-3 transmission line 106 comprises 4,096 port transmission slots while a port 104 adapted for connection to an STS-1 transmission line 106 comprises 1,365 transmission slots.

The hierarchal sets 142 of port transmission slots include a plurality of parent sets 144. Each parent set 144 has its port transmission slots equally divided between a plurality of child sets 146, which may themselves be parent sets 144 to further child sets 146. The port transmission slots of the parent sets 144 are interleaved between the child sets 146 to maintain substantially equal spacing between the transmission slots in each set 144 and 146. Unless otherwise specified, the term each means every one of at least a subset of the identified items. For a parent set 144 having two child sets 146, for example, each child set 146 preferably has every other port transmission slot of the parent set 144.

For the embodiment of FIG. 4, the port memory map 140 comprises 4,096 port transmission slots for an OC-3 port. Each parent set 144 is divided into two child sets 146. The base sets 148 each comprise forty-one (41) port transmission slots corresponding to a base DS-1 transmission rate. The number of transmission slots correspond to a transmission rate when the number of transmission slots is substantially a minimum number necessary to support the rate. The substantial minimum number necessary to support the rate is the smallest integer number of slots that results in a transmission rate equal to or slightly larger than the actual rate.

The hierarchical sets 142 are segregated into primary hierarchical sets 150 and secondary hierarchical sets 152. The primary hierarchical sets 150 comprise a maximum number of port transmission slots that can be recursively divided evenly to reach the base set 148. For the base DS-1 sets 148 in the illustrated embodiment, the primary hierarchical sets 150 comprise 2,624 port transmission slots. The secondary hierarchical sets 152 comprise the remaining 1,472 port transmission slots of the OC-3 bandwidth.

The primary hierarchical sets 150 comprise an initial set ($P_{64}$) at a first primary level 145. The initial set ($P_{64}$) includes all of the 2,624 port transmission slots of the primary hierarchical sets 150. As described in more detail below, these port transmission slots are substantially equally spaced throughout the port transmission frame to provide minimal cell delay variation (CDV). The initial set ($P_{64}$) is divided into two child sets ($P_{32-1}$ and $P_{32-2}$) each having a disparate interleaved half of the port transmission slots of the initial set ($P_{64}$). Accordingly, the port transmission slots in the child sets ($P_{32-1}$ and $P_{32-2}$) remain substantially equally spaced. The child sets ($P_{32-1}$ and $P_{32-2}$) are divided into further child sets ($P_{16-1}$ ... $P_{16-4}$) which are recursively divided into further child sets ($P_{8-1}$ ... $P_{8-8}$, $P_{4-1}$ ... , $P_{4-16}$, $P_{2-1}$ ... $P_{2-32}$, and $P_{1-1}$ ... $P_{1-64}$) until base transmission sets ($P_{1-1}$ ... $P_{1-64}$) are reached. The resulting primary sets 150 each have substantially evenly spaced transmission slots and represent a particular bandwidth in the transmission line. Accordingly, a primary set 150 can be allocated to a virtual interface 114 to provide desired bandwidth with minimal cell delay variation (CDV).

The secondary hierarchical sets 152 comprise a plurality of tiers 154 each comprising a maximum number of remaining port transmission slots that can be recursively divided evenly to reach the base set 148. The port transmission slots in each tier 154 are evenly spaced to the extent possible to minimize cell delay variation (CDV). In each tier 154, as previously described in connection with the primary hierarchical sets 150, an initial set ($S_{32}$, $S_2$, or $S_1$) is recursively divided into two child sets 146 until the base set 148 is reached. Each child set 146 comprises an interleaved half of the port transmission slots of the parent set 144.

Each hierarchical set 142, whether parent or child 144 or 146 or primary or secondary 150 or 152 can be allocated to a scheduler 122 of a transmission line interface 100 coupled to the port 104. To optimize cell delay variation for the interface 100, each is preferably assigned a single hierarchical set 142. However, multiple hierarchical sets 142 can be assigned as needed to optimize bandwidth usage.

Figure 5:
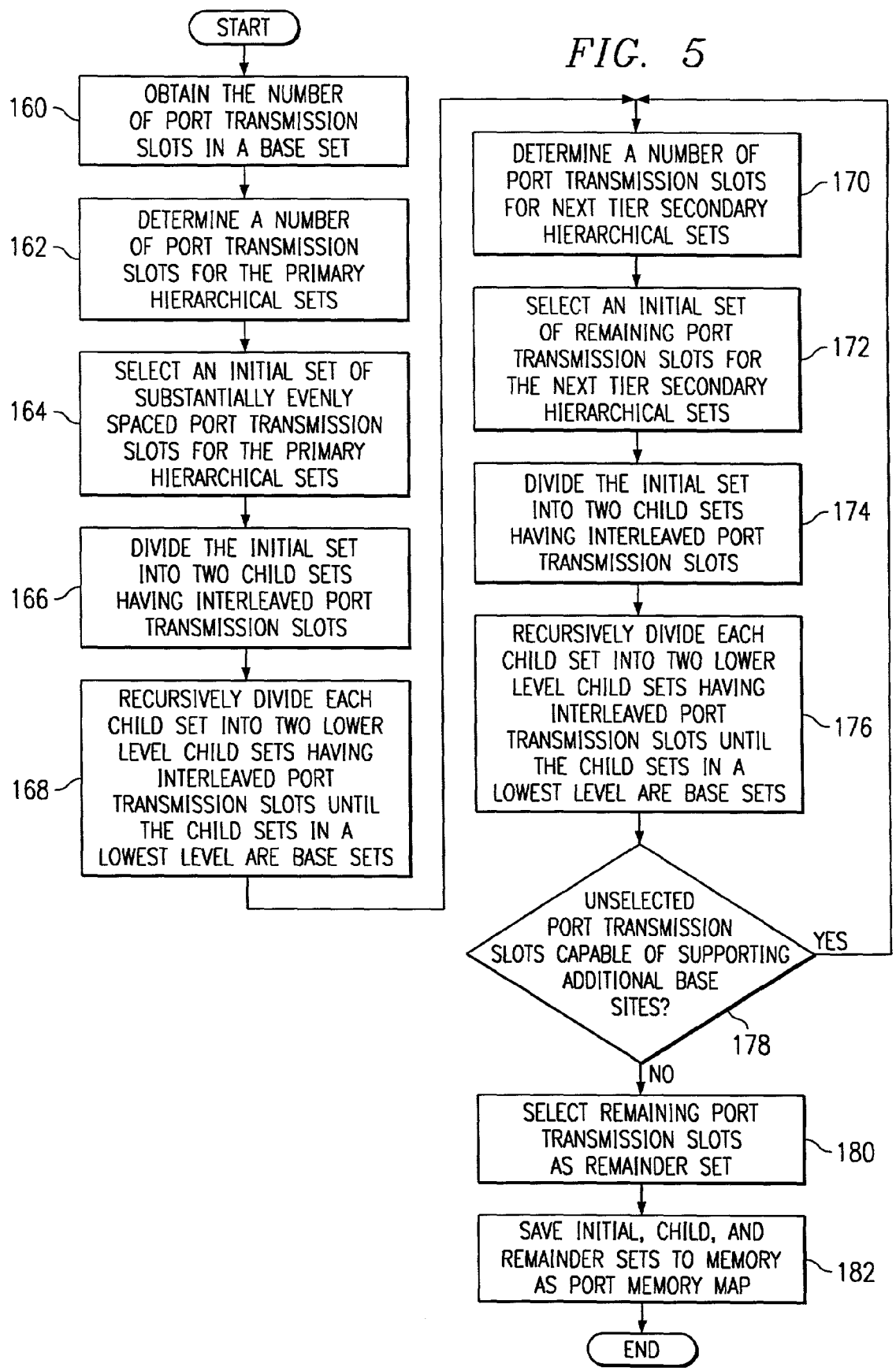
FIG. 5 is a flow diagram illustrating a method for generating the map of FIG. 4 in accordance with one embodiment of the present invention.

FIG. 5 is a flow diagram illustrating a method for generating the port memory map 140 for a port 104 in accordance with one embodiment of the present invention. In this embodiment, the port 104 has a number of transmission slots that cannot be recursively divided evenly to yield the base set 148. Accordingly, the port memory map 140 will include both primary and secondary sets 150 and 152. In other embodiments in which the total number of port transmission slots can be recursively and evenly divided to reach the base set 148, all resulting sets may be primary sets 150 with optimized spacing. Also in this embodiment, the port memory map 140 is generated by the interface controller 96 in the add/drop multiplexer 80. The port memory map 140 may be independently generated and provided to the add/drop multiplexer 80 for the port 104.

Referring to FIG. 5, the method begins at step 160 in which the number of port slots in a base set 148 is obtained. The number of port slots correspond to a base transmission rate for the port 104. As previously described, the base transmission rate is the foundation rate for the port 104 or a virtual tunnel 116 supported by the port 104.

Proceeding to step 162, the number of port transmission slots for the primary hierarchical sets 150 is determined. This number comprises a maximum number of port transmission slots that can be recursively divided evenly to reach the base set 148. For the embodiment of FIG. 4 in which each parent set 144 is divided into two child sets 146, the number of port transmission slots for the primary hierarchical sets 150 is the largest 2N multiple of the number of port transmission slots in a base set 148 that is less than or equal to the total number of port transmission slots.

Next, at step 164, the determined number of port transmission slots for the primary hierarchical sets 150 are selected as an initial set from the entirety of the port transmission slots. The selected port transmission slots are substantially evenly spaced to provide minimal cell delay variation (CDV) for the primary hierarchical sets 150. Further details for selecting substantially evenly spaced port transmission slots are described below in connection with FIG. 6.

At step 166, the initial set is divided into two child sets 146. Each child set 146 has a disparate interleaved half of the port transmission slots of its parent set 144. Next, at step 168, each child set 146 is recursively divided into two lower-level 145 child sets 146 until the child sets 146 in a lowest level 145 are base sets 148. Accordingly, each of the primary hierarchical sets 150 correspond to a base rate or is a multiple of the base rate.

Proceeding to step 170, a number of port transmission slots for a next tier 154 of secondary hierarchical sets 152 is determined. The next tier secondary hierarchical sets 152 comprise a maximum number of remaining port transmission slots that can be recursively divided evenly to reach the base set 148. The remaining port transmission slots are transmission slots of the port 104 not previously selected for the primary hierarchical sets 150 or a previous tier 154 of secondary hierarchical sets 152.

At step 172, the determined numbered port transmission slots for the next tier secondary hierarchical sets 152 are selected as an initial set from the remaining port transmission slots. The selected port transmission slots are evenly spaced in the port transmission frame to the extent possible to minimize cell delay variation (CDV) for the next tier secondary hierarchical sets 152. Further details for selecting the port transmission slots are described below in connection with FIG. 6.

Proceeding to step 174, the initial set is divided into two child sets 146. Each child set 146 has a disparate interleaved half of the port transmission slots of its parent set 144. At step 176, each child set 146 is recursively divided into two lower-level 145 child sets 146 until the child sets in a lowest level 145 are base sets 148. Accordingly, each secondary hierarchical set 152 correspond to a base transmission rate or is a multiple of the base transmission rate.

Proceeding to decisional step 178, the interface controller 98 determines whether the number of unselected port transmission slots are capable of supporting additional base sets 148. If the unselected port transmission slots are capable of supporting additional base sets 148, the remaining port transmission slots can be further grouped into hierarchical sets 142 and the Yes branch of decisional step 178 returns to step 170 where the number of port transmission slots for the next tier of secondary hierarchical sets 152 is determined. After all port transmission slots capable of supporting a base set 148 have been selected, the No branch of decisional step 178 leads to step 180. At step 180, the remaining port transmission slots are selected as a remainder set that can be combined with one or more of the hierarchical sets 142 to increase the bandwidth of a virtual tunnel 116, be used as a limited non-standard virtual tunnel 116, or be otherwise suitably used as needed to transport data from the port 104.

Next, at step 182, the initial, child, and remainder sets are saved to a computer readable medium as the port memory map 140. In this way, port transmission slots are grouped into a plurality of hierarchical sets 142 having interleaved port transmission slots. The hierarchical sets 142 can be dynamically allocated to virtual or physical interfaces 114 or 118 to provide transmission slots for any supportive bandwidth. The hierarchical sets 142 are also sized to be equal to or only slightly larger than a base transmission rate. As a result, allocatable bandwidth in a transmission line 106 is maximized.

Figure 6:
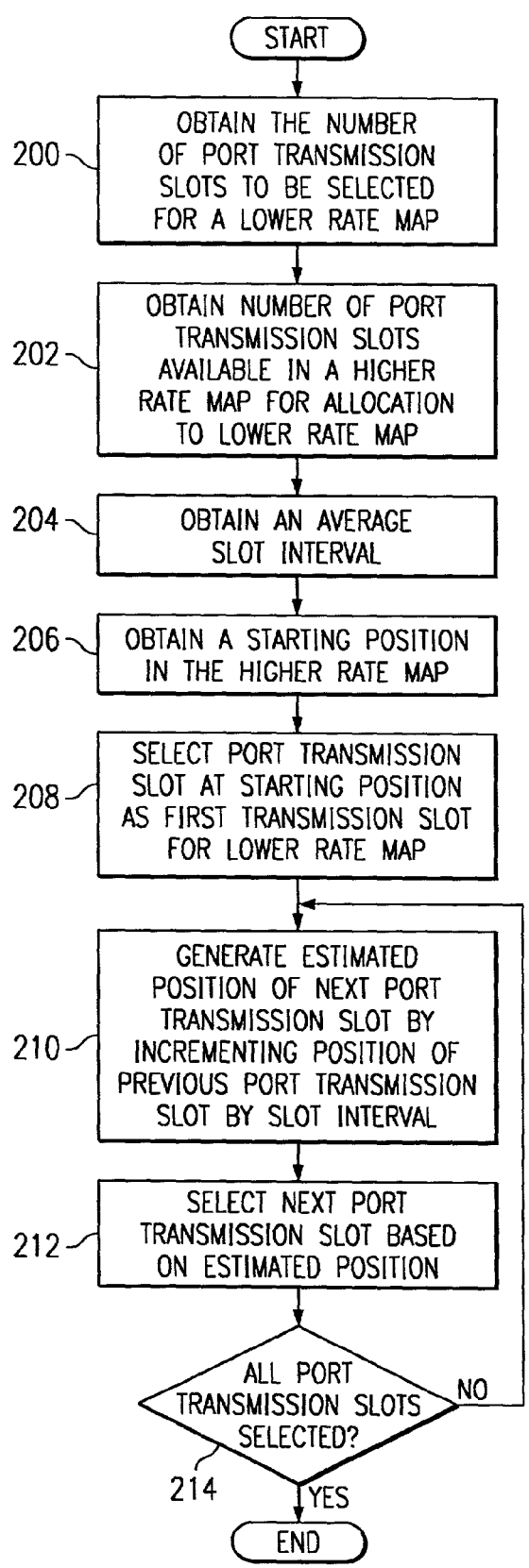
FIG. 6 is a flow diagram illustrating a method for selecting evenly spaced transmission slots for generation of the map of FIG. 4 in accordance with one embodiment of the present invention.

FIG. 6 is a flow diagram illustrating a method for selecting substantially evenly spaced transmission slots for the primary and secondary sets 150 and 152 of the port memory map 140 in accordance with one embodiment of the present invention. The method may be used to map any lower rate map of transmission slots into a higher rate map of transmission slots.

Referring to FIG. 6, the method begins at step 200 in which a number of port transmission slots to be selected for a lower rate map is obtained. For the port memory map 140, the lower rate map may be the primary hierarchical sets 150 or a tier of secondary hierarchical sets 152.

Proceeding to step 202, the number of port transmission slots available in a higher rate map for allocation to the lower rate map is obtained. For the primary hierarchical sets 150, the number of port transmission slots available for allocation to the primary hierarchical sets 150 comprise the total number of transmission slots for the port 104. Accordingly, spacing may be optimized for the primary hierarchical set 150. For a tier of secondary hierarchical sets 152, the number of port transmission slots available for allocation to the secondary hierarchical sets 152 comprise the remaining transmission slots of the port that have not been previously allocated to the primary hierarchical sets 150 or previous tiers of secondary hierarchical sets 152.

Next, at step 204, an average slot interval is obtained. As used herein, obtained means determined or received. In one embodiment, the average slot interval comprises the ratio of the number of port transmission slots available for selection in the higher rate map divided by the number of port transmission slots to be selected for the lower rate map.

Proceeding to step 206, a starting position in the higher rate map is obtained. In one embodiment, the starting position is the first available port transmission slot in the higher rate map. At step 208, the port transmission slot at the starting position is selected as the first port transmission slot for the lower rate map.

At step 210, an estimated position of a next port transmission slot is generated by incrementing the position of the previous port transmission slot by the average slot interval. Accordingly, port transmission slots for the lower rate map are each separated by the average interval to provide optimized cell delay variation. At step 212, the next port transmission slot is selected based on the estimated position. In one embodiment, a floor position is determined from a floor function of the estimated position. In this embodiment, the transmission slot at the floor position is selected as the next port transmission slot.

Proceeding to decisional step 214, it is determined whether all of the port transmission slots have been selected for the lower rate map. If all of the port transmission slots have not yet been selected, the No branch of decisional step 214 returns to step 210 where an estimated position of the next port transmission slot is generated. After all of the port transmission slots have been selected, the Yes branch of decisional step 214 leads to the end of the process. In this way, port transmission slots are selected by the interface controller 96 or other device during generation of the port memory map 104 or for other lower rate maps in a higher rate map. The transmission slots are substantially evenly spaced to the extent possible throughout the transmission frame of the port. This provides minimal cell delay variation for both dedicated and dynamic bandwidth traffic, and for multiple virtual interfaces operating at different rates.

Figure 7:
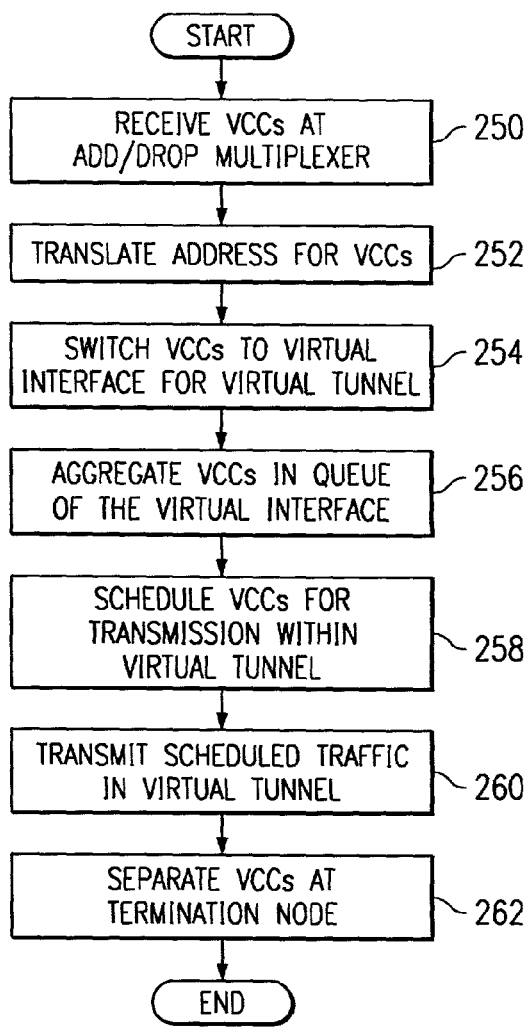
FIG. 7 is a flow diagram illustrating the operation of the add/drop multiplexer of FIG. 2 in accordance with one embodiment of the present invention.

FIG. 7 is a flow diagram illustrating operation of the add/drop multiplexer 80 in accordance with one embodiment of the present invention. In this embodiment, the add/drop multiplexer 80 processes ATM traffic including a plurality of virtual channel connections (VCCs) designating a virtual tunnel 116 in a transmission line 106 connected to an outlet port 104 of the multiplexer 80. The virtual tunnel 116 is controlled by a virtual interface 114 and defined by a hierarchical set 142 of port transmission slots allocated to the virtual interface 114.

Referring to FIG. 7, the method begins at step 250 in which the add/drop multiplexer 80 receives disparate virtual channel connections (VCCs) designating the virtual tunnel 116 from one or more sources. At step 252, the add/drop multiplexer 80 translates necessary virtual path (VP) and virtual channel (VC) addresses for the virtual channel connections (VCCs). Based on the translated address, the add/drop multiplexer 80 switches the VCCs to the virtual interface 114 for the virtual tunnel 116.

Proceeding to step 256, the virtual channel connections (VCCs) are aggregated in the queue 120 of the virtual interface 114. The virtual channel connections (VCCs) may include dedicated traffic such as constant bit rate (CBR) or real-time variable bit rate (VBR) traffic or dynamic traffic such as available bit rate (ABR) traffic or unspecified bit rate (UBR) traffic. At step 258, the scheduler 122 for the virtual interface 114 schedules the virtual channel connections (VCCs) for transmission within the port transmission slots of the allocated hierarchical set 142. The port transmission slots define the virtual tunnel 116. Accordingly, the virtual channel connections (VCCs) need not compete with other traffic in the transmission line 106.

Proceeding to step 260, scheduled traffic is transmitted in the virtual tunnel 116 of the transmission line 106. The traffic may travel in the virtual tunnel 116 to a next node or through a plurality of intermediate nodes to a remote termination node. At step 262, the virtual channel connections (VCCs) are separated and individually routed. In this way, dynamic traffic is transported within a virtual tunnel, and can even be combined with dedicated or other dynamic traffic sources. As a result, virtual tunnels can be used for all types of traffic and quality of service (QoS) levels can be provided for dynamic traffic. This allows a telecommunications provider to better package resources and to better support its customers whose dynamic traffic no longer need compete with that of other businesses.

Although the present invention has been described with several embodiments, various changes and modifications may be suggested to one skilled in the art. It is intended that the present invention encompass such changes and modifications as fall within the scope of the appended claims.

What is claimed is:

1. A network element for a telecommunications network, comprising:
   a port for connection to a transmission line of a telecommunications network;
   a plurality of transmission line interfaces, the transmission line interfaces each including a scheduler to transmit traffic in port transmission slots allocated to the transmission line interface;
   a storage medium; and
   an interface controller stored in the storage medium, the interface controller operable to selectively and simultaneously couple at least two of the plurality of transmission line interfaces to the port and to allocate a disparate portion of port transmission slots to each of the transmission line interfaces coupled to the port based on hierarchical levels assigned to each port transmission slot.

2. The network element of claim 1, further comprising:
   a plurality of ports for connection to disparate transmission lines of the telecommunications network; and
   the interface controller operable to selectively couple at least two of the transmission line interfaces to each port and, for each port, to allocate a disparate portion of port transmission slots to each of the transmission line interfaces coupled to the port.

3. The network element of claim 2, further comprising:
   a map of port transmission slots for each of the ports, the maps each comprising:
      a plurality of hierarchical sets of port transmission slots;
      the hierarchical sets comprising a plurality of parent sets each having its port transmission slots divided between a plurality of child sets;
      the child sets comprising interleaved port transmission slots; and
   the interface controller further operable to selectively allocate to each of the transmission line interfaces coupled to a port a disparate hierarchical set of port transmission slots from the map for the port.

4. The network element of claim 2, further comprising:
   the interface controller operable to generate a map of port transmission slots for each of the ports, the maps each comprising:
      a plurality of hierarchical sets of port transmission slots;
      the hierarchical sets comprising a plurality of parent sets each having its port transmission slots divided between a plurality of child sets;
      the child sets comprising interleaved port transmission slots; and
   the interface controller operable to selectively allocate to each of the transmission line interfaces coupled to a port a disparate hierarchical set of port transmission slots from the map for the port.

5. The network element of claim 1, wherein the network element comprises an asynchronous transport mode (ATM) element.

6. The network element of claim 1, wherein the network element comprises a telephony switch.

7. The network element of claim 1, further comprising:
a map of port transmission slots, the map comprising:
a plurality of hierarchical sets of port transmission slots;
the hierarchical sets comprising a plurality of parent sets each having its port transmission slots divided between a plurality of child sets;
the child sets comprising interleaved port transmission slots; and
the interface controller further operable to selectively allocate to each of the transmission line interfaces coupled to the port a disparate hierarchical set of the port transmission slots from the map.

8. The network element of claim 7, the hierarchical sets each further comprising substantially evenly spaced port transmission slots.

9. The network element of claim 1, further comprising:
the interface controller operable to generate a map of port transmission slots, the map comprising:
a plurality of hierarchical sets of port transmission slots;
the hierarchical sets comprising a plurality of parent sets each having its port transmission slots divided between a plurality of child sets;
the child sets comprising interleaved port transmission slots; and
the interface controller operable to selectively allocate to each of the transmission line interfaces coupled to the port a disparate hierarchical set of port transmission slots from the map.

10. A telecommunications system, comprising:
a first network element coupled to a remote second network element via a transmission line;
the first network element comprising:
a port connected to the transmission line;
a plurality of transmission line interfaces, the transmission line interfaces each including a scheduler to transmit traffic in port transmission slots allocated to the transmission line interface;
a storage medium; and
an interface controller stored in the storage medium, the interface controller operable to selectively and simultaneously couple at least two of the plurality of transmission line interfaces to the port and to allocate a disparate portion of port transmission slots to each of the transmission line interfaces coupled to the port based on hierarchical levels assigned to each port transmission slot.

11. The telecommunications system of claim 10, further comprising:
a map of port transmission slots, the map comprising:
a plurality of hierarchical sets of port transmission slots;
the hierarchical sets comprising a plurality of parent sets each having its port transmission slots divided between a plurality of child sets;
the child sets comprising interleaved port transmission slots; and
the interface controller further operable to selectively allocate to each of the transmission line interfaces coupled to the port a disparate hierarchical set of port transmission slots from the map.

12. The telecommunications system of claim 11, the hierarchical sets each further comprising substantially evenly spaced port transmission slots.

13. The telecommunications system of claim 10, further comprising:
the interface controller operable to generate a map of port transmission slots, the map comprising:
a plurality of hierarchical sets of port transmission slots;
the hierarchical sets comprising a plurality of parent sets each having its port transmission slots divided between a plurality of child sets;
the child sets comprising interleaved port transmission slots; and
the interface controller operable to selectively allocate to each of the transmission line interfaces coupled to the port a disparate hierarchical set of port transmission slots from the map.

14. A method for transmitting traffic in a transmission line, comprising:
providing a plurality of schedulers for selective coupling to a port for a transmission line;
using an interface controller in communication with the plurality of schedulers to selectively and simultaneously couple at least two of the plurality of schedulers to the port and to allocate a disparate portion of a plurality of port transmission slots to each of the schedulers coupled to the port based on hierarchical levels assigned to each port transmission slot; and
using each of the schedulers to transmit, in the portion of port transmission slots allocated to the scheduler, traffic designating a virtual tunnel defined by the portion of port transmission slots based on hierarchical levels assigned to each port transmission slot.

15. The method of claim 14, further comprising using at least one of the schedulers to transmit dynamic traffic in the portion of port transmission slots.

16. The method of claim 14, further comprising using at least one of the schedulers to transmit a combination of dynamic and dedicated traffic in the portion of port transmission slots.

17. The method of claim 14, further comprising using at least one of the schedulers to transmit available bit rate (ABR) asynchronous transport mode (ATM) traffic in the portion of port transmission slots.

18. The method of claim 14, further comprising using at least one of the schedulers to transmit unspecified bit rate (UBR) asynchronous transport mode (ATM) traffic in the portion of the port transmission slots.

19. The method of claim 14, further comprising selectively allocating to each of the schedulers the portion of port transmission slots.

20. The method of claim 14, further comprising separately queuing traffic for each scheduler.

21. A method for transmitting traffic in a virtual tunnel of a transmission line, comprising:
receiving a request to transmit specified traffic in a virtual tunnel having a bandwidth;

identifying an hierarchical set of port transmission slots providing at least the bandwidth;

allocating the hierarchical set of port transmission slots to one of a plurality of transmission line interfaces, each transmission line interface having a corresponding scheduler coupled thereto;

using the scheduler of the one of the plurality of transmission line interfaces to transmit the specified traffic in the hierarchical set of port transmission slots;

Selecting a plurality of substantially evenly spaced port transmission slots as an initial set of transmission slots;

dividing the initial set of transmission slots into a plurality of child sets having interleaved first port transmission slots;

recursively dividing each child set into a plurality of lower level child sets having interleaved second port transmission slots until child sets in a lowest level each correspond to a base transmission rate;

storing the initial set and the child sets as a map including a plurality of hierarchical sets; and wherein the hierarchical set of port transmission slots is selected from the map.

* * * * *

UNITED STATES PATENT AND TRADEMARK OFFICE
CERTIFICATE OF CORRECTION

PATENT NO. : 7,245,585 B2
APPLICATION NO. : 09/997626
DATED : July 17, 2007
INVENTOR(S) : Edward T. Sullivan et al.

It is certified that error appears in the above-identified patent and that said Letters Patent is hereby corrected as shown below:

Title Page 2, Other Publications, Right Column, Line 52, after "SwitchStAR™ ATM Cell Based" delete "8+8" and insert -- 8x8 --.
Title Page 2, Other Publications, Right Column, Line 56, after "SwitchStAR™ ATM Cell Based" delete "8+8" and insert -- 8x8 --.

Signed and Sealed this

Thirteenth Day of January, 2009

JON W. DUDAS
*Director of the United States Patent and Trademark Office*